C. F. WRIGHT.
MACHINE FOR MAKING BOXES.
APPLICATION FILED SEPT. 23, 1919.

1,348,197.

Patented Aug. 3, 1920.
4 SHEETS—SHEET 1.

Inventor
Charles F. Wright
by his Attorney
John R. Nolan

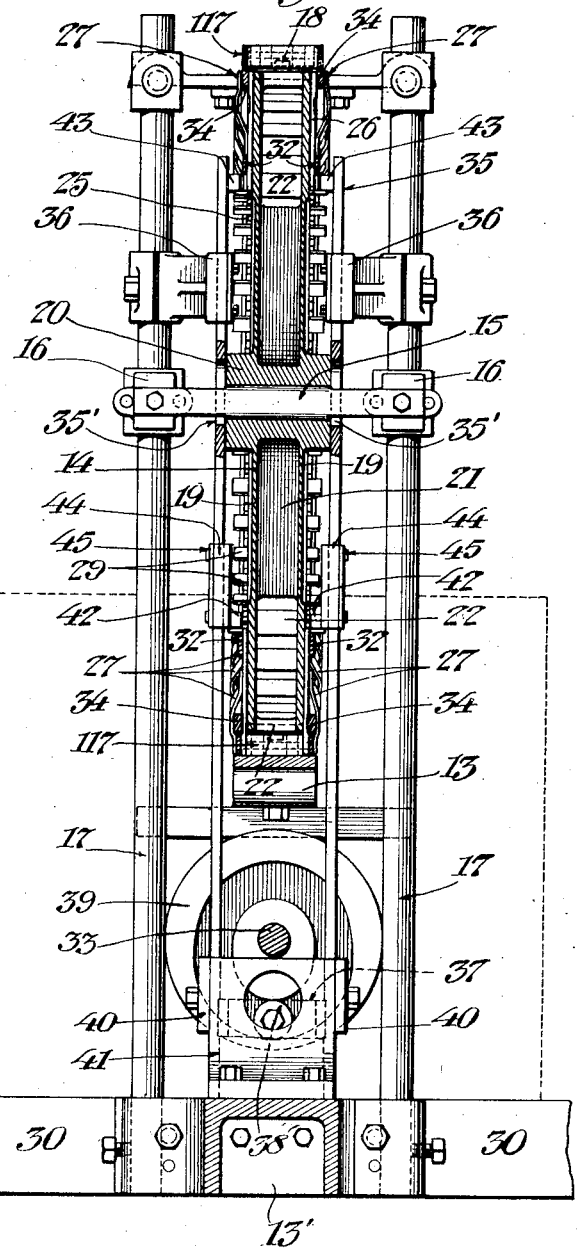

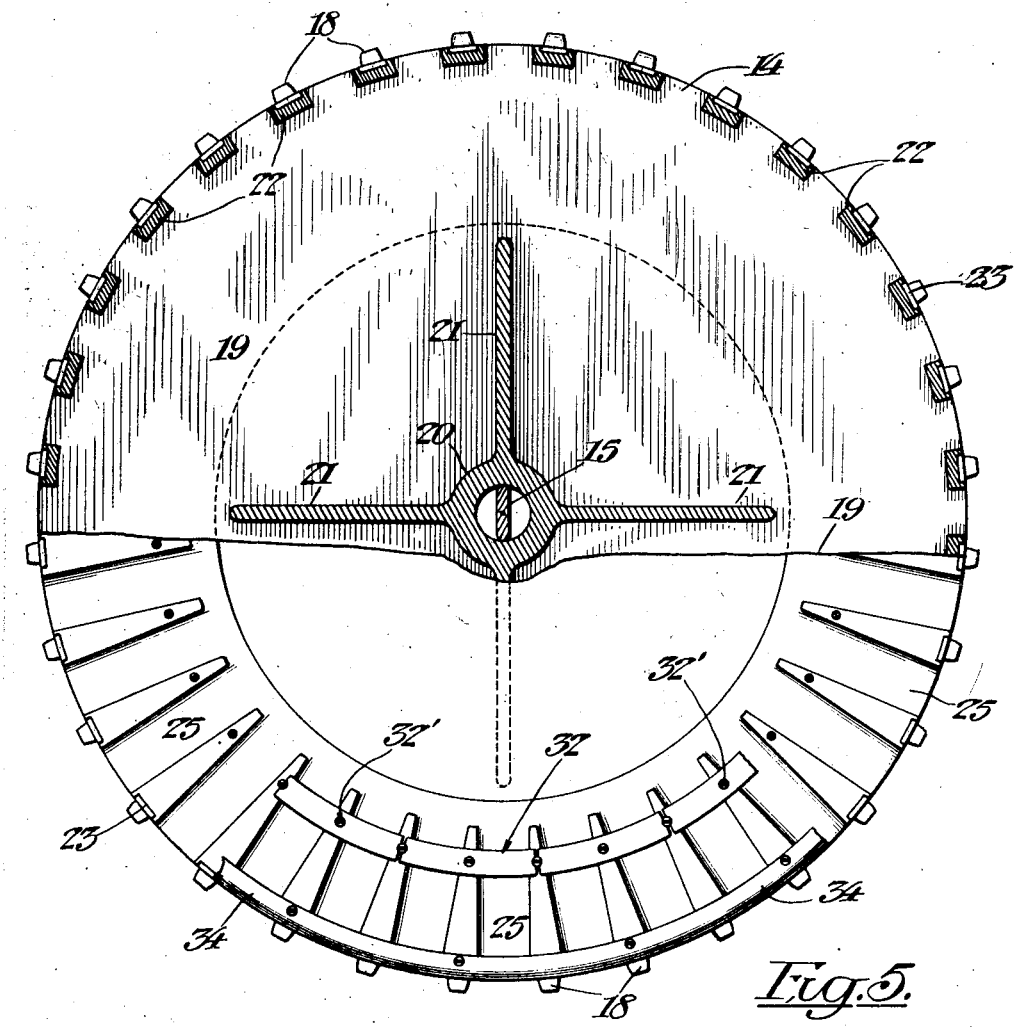
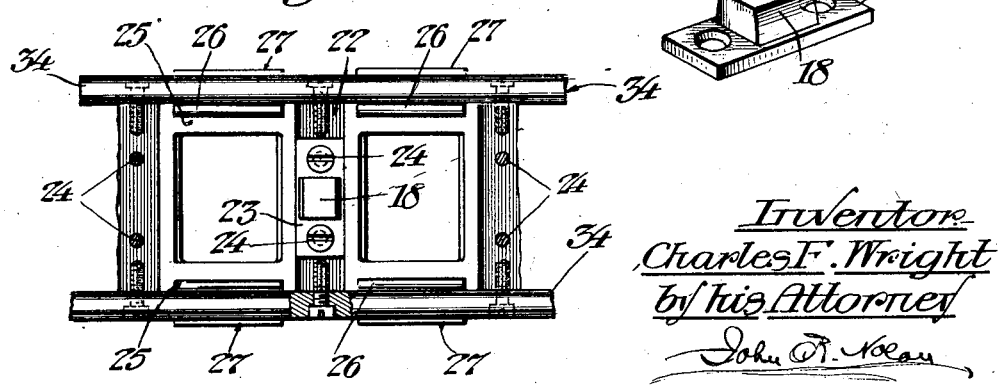

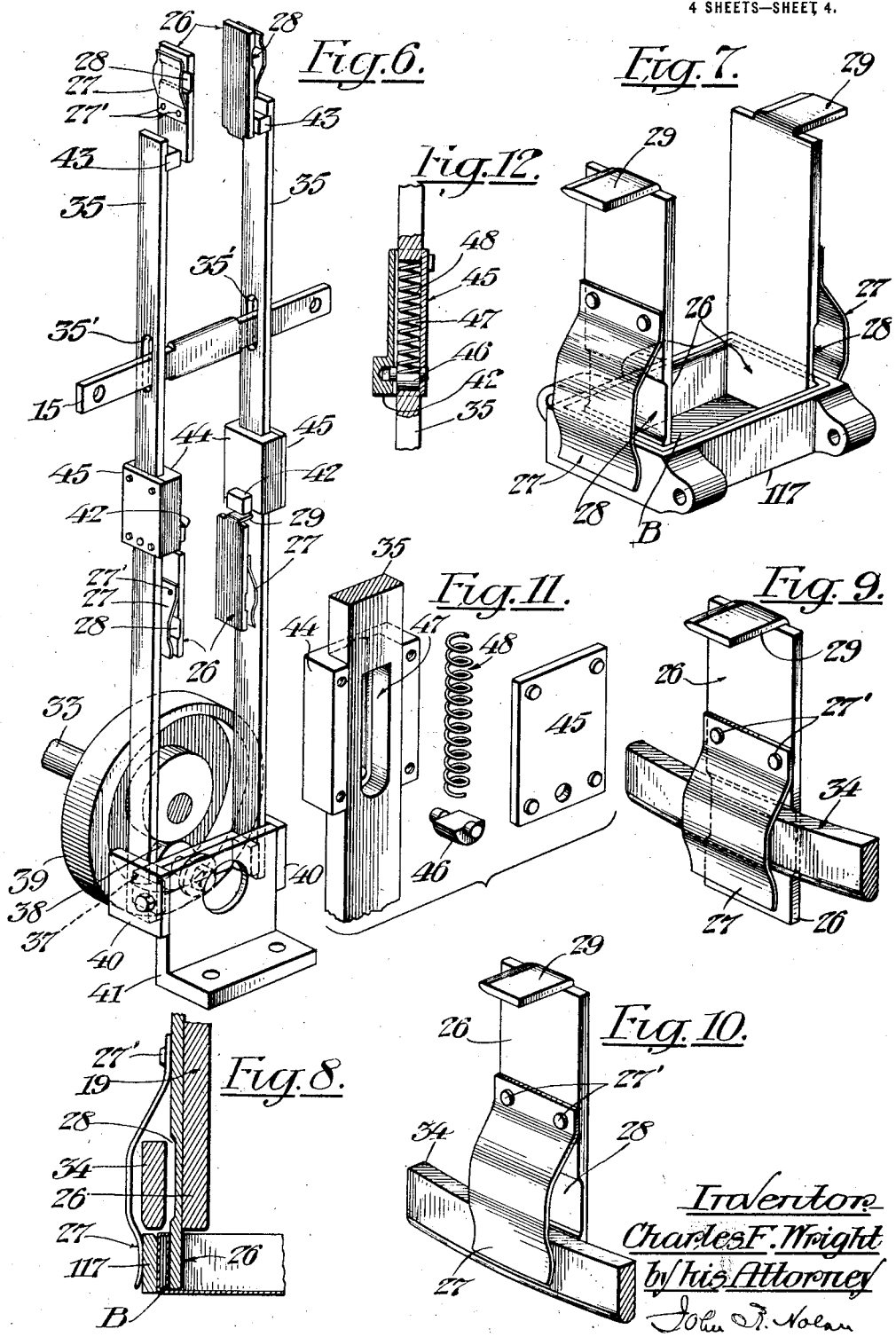

UNITED STATES PATENT OFFICE.

CHARLES F. WRIGHT, OF BARBERTON, OHIO, ASSIGNOR TO THE DIAMOND MATCH COMPANY, OF CHICAGO, ILLINOIS, A CORPORATION OF ILLINOIS.

MACHINE FOR MAKING BOXES.

1,348,197.  Specification of Letters Patent.  Patented Aug. 3, 1920.

Application filed September 23, 1919. Serial No. 325,798.

*To all whom it may concern:*

Be it known that I, CHARLES F. WRIGHT, a citizen of the United States, and resident of Barberton, in the county of Summit and State of Ohio, have invented certain new and useful Improvements in Machines for Making Boxes, of which the following is a specification.

This invention relates to machines for making boxes, and more especially pasteboard boxes having their walls reinforced and strengthened by inturned integral folds or extensions of the material of which the bodies of the boxes are composed, such, for example, as illustrated in Letters Patent of the United States No. 1,293,288, dated February 4, 1919.

In the patented machine referred to a strip of paste-board, or similar box-stock, is progressively drawn from a roll and advanced through a box making path, comprising strip-feeding and scoring mechanisms, glue-applying mechanism, lap-folding mechanism, blank cutting mechanism, and mechanism for converting succeeding blanks into boxes; the last named mechanism including a conveyer comprising an endless chain of rectangular open links into which partially-formed boxes, with upwardly extending end laps with glue applied thereto, are entered and advanced to folding devices, whereby the laps are forced down into the interior of the box and pressed against the inner end walls thereof in order to reinforce the latter, all as will be more fully understood by reference to said patent.

My present invention, which may be described as an improvement on or attachment to the said patented machine, embodies supplemental mechanism of novel construction so arranged and operated in relation to the path of travel of the conveyer after it leaves the end folding devices, as to engage the reinforced ends of the boxes and apply additional pressure thereto for an extended interval of time.

In the preferred form of embodiment of my invention herein illustrated the pocketed conveyer or chain in which the boxes are successively formed is flexed about a wheel structure which is impelled concurrently with the chain. This structure includes two corresponding circular series of clamping elements which are spaced correspondingly with the pockets of the conveyer and are constructed and actuated in such a manner as to engage and exert a prolonged pressing action on the ends of the successive boxes as they are carried around the wheel structure by the conveyer.

The invention also comprises novel features of construction and combinations of elements, all of which will be hereinafter described and claimed.

In the drawings—

Fig. 2 is a transverse vertical section through said mechanism, as on the line 2—2 of Fig. 1.

Fig. 3 is an elevation, partly in section, of a sprocket-wheel for the guidance of the box chain and the support of a circular series of paired clamping devices in operative relation to said chain and its contained boxes.

Fig. 4 is a sectional elevation, of a portion of the wheel, showing adjacent box clamping devices therein.

Fig. 5 is a perspective view of one of the detachable teeth of the sprocket-wheel.

Fig. 6 is a skeleton perspective view of upper and lower sets of clamping devices, and cam-actuated frame mechanism for simultaneously shifting the same to move the lower set into and the upper set out of box-gripping position.

Fig. 7 is a perspective view of a set of clamping devices as engaged with the respective ends of a box contained in a link of the chain.

Fig. 8 is a vertical section through the clamping members, and adjuncts, at one side of Fig. 7, showing the relative position of a stationary cam ring for the outer spring member.

Figs. 9 and 10 are perspective views of one of the clamping devices and a portion of the cam ring, showing said devices respectively in clamping and releasing positions.

Fig. 11 is a perspective view of a portion of one of the clamp operating bars, and also the disassembled parts of a yieldingly supported tappet thereon.

Fig. 12 is a section of the bar and the yielding tappet device.

Figure 1:
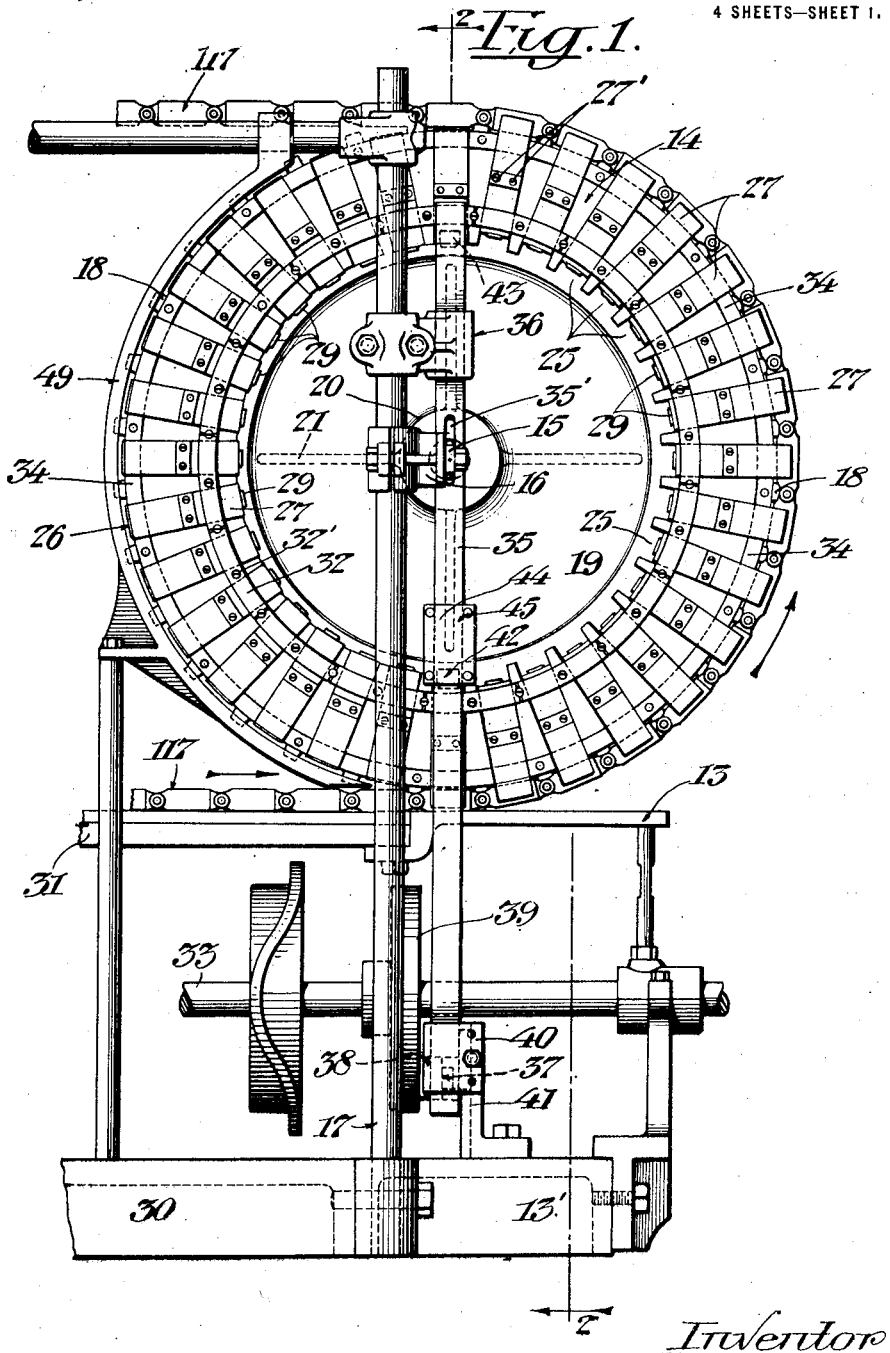
Figure 1 is a side elevation of an end portion of a box-making machine equipped with pressure applying mechanism embodying the preferred form of my invention, only so much of the main machine being shown as is necessary to illustrate the invention.

Referring to the drawings, 30 designates a part of the main supporting frame, including the rear end of the main table 31 of a box-making machine; 33 designates a part of the main driving shaft of the machine, and 117 designates a part of the intermittently-movable endless chain of hollow links in which the boxes with reinforced ends are formed as such links approach the rear of the table, all as described in Patent No. 1,293,288 aforesaid.

13 designates a rear extension of the main table and 13' a similar extension of the bed of the main frame.

Mounted above the table extension is a wheel 14 which provides, among other things, a support and guide for the box-chain as it is flexed upwardly from the rear of the table after the boxes, with their reinforced ends, have been formed in the succeeding links. In the present instance this wheel is loosely mounted on a fixed horizontal shaft 15 which is supported by brackets 16 extending from spaced parallel posts 17 rising from the bed of the main frame. The periphery of the wheel is provided with regularly spaced teeth 18 which are embraced by the succeeding links of the chain during the travel of the latter, and hence the wheel is impelled intermittently and concurrently by and with the chain. This wheel is made as light as possible consistent with ample strength for its intended purpose, and accordingly the body of the wheel is preferably a light metal casting comprising two spaced heads or disks 19 connected centrally by a hub 20 and radial ribs 21, and united peripherally by a series of equally-spaced channeled cross-bars 22. Hard metal inserts 23 having spuds which constitute the sprocket teeth 18, are seated in the respective channels of the cross-bars and are secured in place by screws 24. The outer side of each head or disk has formed therein radial guideways 25 which alternate with the teeth and open to the periphery of the wheel for a purpose hereinafter explained. (See Figs. 3, 4 and 5.)

On each outer side of the wheel are mounted a circular series of counterpart clamping elements which are movable radially beyond and back from the periphery of the wheel. These elements are spaced apart correspondingly with the links of the chain and are disposed in such relation to the teeth 18, that as each link engages the proximate tooth and travels with the chain, two of said elements, one on each side of the wheel, are in close relation to the respective ends of the link and its contained box (B).

Each of the clamping elements preferably comprises a pair of complementary jaws, 26, 27 respectively. The jaw 26 consists of a rigid metal plate slightly less in width than the interior of a box, and fitted to slide in one of the radial guideways 25 in the adjacent side of the wheel close to the periphery of the latter. The plate is provided in its inner face with an arcuate recess 28 concentric with the wheel, and at its inner end with an outwardly projecting lug 29. The jaw 27 comprises a bowed piece of spring metal which is riveted or otherwise fastened at its inner end to the outer side of the jaw plate 26, as at 27', the free end of the spring jaw tending normally to lie in gripping relation to the outer end of the rigid jaw and yet having capacity for outward movement therefrom against the inherent elasticity of the spring metal. In the present instance the series of jaw plates 26 are maintained slidably in the respective guideways 25 by a segmental ring 32, the successive segments of which bridge and are detachably secured to the walls of said ways by screws 32' or the like. (See Fig. 3.)

The oppositely-disposed pairs of jaws on the respective sides of the wheel are so spaced apart that when a chain link, with its contained box, is positioned directly in line vertically with the axis of the wheel, a pair of jaws overhangs each end of the link in such a manner that if the lower or acting end of the spring jaw be opened and the jaws lowered they will embrace the end of the link and the adjacent end wall of the box; that is to say, the rigid jaw will enter the link adjacent the box end, and the spring jaw will depend adjacent the outer side of the link. If then the spring jaw be released it will bear hard against the end of the link and thus draw the rigid jaw forcibly against the opposing end of the box. Thus the reinforced end of the box will be securely clamped against the proximate wall of the link until the jaws have been opened and retracted from the link.

The preferred means herein illustrated for actuating the pairs of jaws at proper intervals of time during the travel of the chain about the wheel, is as follows:

Secured to each side of the wheel, near its periphery and concentric thereto, is a ring 34 which is embraced by the inner and outer jaws of the adjacent circular series of pairs of jaws. When the complementary jaws occupy their inward radial position the free ends of the spring jaws bear against and are held in outpressed position by the opposing rings 34, but when the jaws are moved radially outward, their free or acting ends escape the rings and resume their normal or clamping condition, which rings then lie in the open spaces between the bows of the respective spring jaws and the opposite recesses of the adjacent fixed jaws. (See Figs. 8, 9 and 10.)

Adjacent the respective sides of the wheel is a vertically reciprocative frame comprising two parallel vertical bars 35 which are mounted to slide in guide brackets 36 secured to the respective posts 17, the bars being appropriately slotted, as at 35′, to embrace the fixed shaft 15 on which the wheel 14 is mounted. The lower ends of the two bars 35 are connected by a cross-bar 37 provided with a laterally-projecting stud or roll 38 which enters the groove of a face cam 39 on the main shaft. The contour of the cam groove is such as to effect the vertical reciprocation (two strokes) of the bars 35 in each dwell of the wheel structure. The lower ends of the two bars are preferably provided with lateral guide pieces 40 which slidably embrace an upstanding bracket 41 on the bed extension. (See Figs. 1, 2 and 6).

On the inner side of each bar 35 are two spaced apart lower and upper tappets 42, 43, respectively, which are so positioned as to overhang the lugs 29 of the lowermost and uppermost jaws respectively when the wheel is at rest. Thus during the downward stroke of the two bars the tappets 42 thereof impinge against the lugs 29 of the lowermost jaws adjacent the respective sides of the underlying chain link, and project said jaws beyond the periphery of the wheel in a manner to embrace and grasp the link and the ends of the contained box, as above described. At the same time the tappets 43 impinge against the opposing lugs 29 of the uppermost jaws (which were previously projected when they were positioned at the bottom of the wheel) and retract said latter jaws from the link and the box ends. The lower tappets 42 are preferably yieldingly supported on the respective bars in order to exert a cushioning effect on the jaws as the latter approach and grasp the box ends, and thus obviate any liability of abrading or rupturing the box material. In the present instance each of the tappets 42 is formed on a channeled member 44 which is slidably fitted to the bar and is provided with a cap-plate 45. Supported in the lower portion of the member and its cap-plate, are the respective ends of a crosspiece 46 which extends freely through a suitable slot 47 in the bar; a spring 48 being seated in the slot so as to bear against the piece 46 and the upper end of the slot, and thus maintain the tappet supporting member yieldingly in down position. (See Figs. 6, 11 and 12).

By the above described construction it will be seen that the two oppositely-disposed pairs of jaws at the bottom of the wheel are projected into efficient clamping engagement with the respective end walls of each box when it is advanced by the chain beneath the wheel structure, and that said jaws remain in this condition until they reach the top of the structure, whereupon they are retracted. The succeeding pairs of jaws thus grasp the opposing chain links and their contained boxes and exert a prolonged pressing action on the ends of the latter during the progress of the chain about one-half of the circumference of the wheel, as seen in Fig. 1. Each succeeding pair of retracted jaws remain in idle position until they reach the bottom of the wheel preparatory to their subsequent projection into clamping relation with the box; the series of jaws when thus retracted being held in their inward position by means of a segmental guard 49 which is suitably supported adjacent the periphery of the wheel.

It is to be understood that I do not limit myself to the specific constructions herein disclosed, as the same may be modified within the principle of my invention and the scope of the appended claims.

I claim—

1. In a box-making machine, the combination with a traveling box-conveyer, of a series of pressing elements arranged adjacent the path of travel of the conveyer and movable concurrently therewith, and means for actuating said elements to project and retract them at intervals into and from clamping relation with the walls of the boxes adjacent thereto within the conveyer.

2. In a box-making machine, the combination with a traveling box-conveyer, of a support mounted to move adjacent to the conveyer and concurrently therewith, clamping elements arranged on said support and movable thereon toward and from the path of the conveyer, and means for actuating said elements to project and retract them at intervals into and from clamping relation with the walls of the boxes adjacent thereto within the conveyer.

3. In a box-making machine, the combination with a traveling box-conveyer, of a wheel mounted to rotate adjacent the path of travel of the conveyer and concurrently therewith, clamping elements arranged on said wheel and radially movable thereon toward and from the path of the conveyer, and means for actuating said elements to project and retract them at intervals into and from clamping relation with the walls of the boxes adjacent thereto within the conveyer.

4. In a box-making machine, the combination with a traveling conveyer comprising open links in which boxes are contained, of a wheel mounted to rotate adjacent the path of travel of the conveyer and having spaced teeth which are engaged by the links of the chain, clamping elements arranged on the respective sides of said wheel and radially movable thereon toward and from the path of the conveyer, and means for actuating said elements to project and retract them at intervals into and from clamping relation with the ends of the boxes adjacent thereto within the conveyer.

5. In a box-making machine, the combination with a traveling box-conveyer, of pressing elements arranged adjacent the path of travel of the conveyer and movable concurrently therewith, said elements comprising pairs of normally-closed jaws arranged in spaced relation to each other, means for moving said jaws into and from clamping relation with the ends of the boxes adjacent thereto within the conveyer, and means for temporarily opening said jaws during their movements from the boxes.

6. In a box-making machine, the combination with a traveling box-conveyer, of a support mounted to move adjacent the conveyer and concurrently therewith, pairs of normally-closed clamping jaws arranged in spaced relation to each other on the said support, means for moving said jaws toward and from the path of the conveyer and the ends of the boxes therein contained, and means for temporarily opening said jaws during their movements from the conveyer.

7. In a box-making machine, the combination with a traveling box-conveyer, of a wheel mounted to rotate adjacent the path of travel of the conveyer and concurrently therewith, pairs of normally-open clamping jaws arranged in spaced relation to each other on the respective sides of the wheel, means for radially moving said jaws toward and from the path of the conveyer and the ends of the boxes therein contained, and means for temporarily opening said jaws during their movements from the conveyer.

8. In a box-making machine, the combination with a traveling box-conveyer, of a support mounted to move adjacent the conveyer and concurrently therewith, pairs of normally-closed clamping jaws arranged in spaced relation to each other on the said support, each pair of jaws comprising a rigid member and a spring member, means for moving said jaws toward and from the path of the conveyer and the ends of the boxes therein contained, and a stationary element for forcing out the spring members and thus temporarily opening the jaws during their movements from the conveyer.

9. In a box-making machine, the combination with a traveling box-conveyer, of a wheel mounted to rotate adjacent the path of travel of the conveyer and concurrently therewith, pairs of normally-open clamping jaws arranged in spaced relation to each other on the respective sides of the wheel, each pair of jaws comprising a rigid member and a spring member, means for radially moving said jaws toward and from the path of the conveyer and the ends of the boxes therein contained, and a stationary element for forcing out the spring members and thus temporarily opening the jaws during their movements from the conveyer.

10. In a box-making machine, the combination with a traveling box-conveyer, of a support mounted to move adjacent the conveyer and concurrently therewith, pairs of clamping jaws arranged in spaced relation to each other on the said support, a reciprocative element having yielding tappets thereon which are adapted to engage the said jaws and move them into clamping relation to the successive boxes on the conveyer, and means for reciprocating said element.

11. In a box-making machine, the combination with a traveling box-conveyer, of a wheel mounted to rotate adjacent the conveyer and concurrently therewith, pairs of clamping jaws arranged in spaced relation to each other on the said wheel and movable radially thereof, said jaws having tappet-engaging portions, a reciprocative element having relatively fixed upper tappets and yielding lower tappets, said upper and lower tappets being arranged to impinge against the engaging devices of the uppermost and lowermost clamping jaws respectively, and means for reciprocating said element.

12. In a box-making machine, the combination with a traveling conveyer comprising open links in which the boxes are contained, of a wheel about which the conveyer is flexed, said wheel having teeth which are engaged by the links, pairs of normally-closed clamping jaws arranged in spaced relation to each other on the respective sides of the wheel, each pair of jaws comprising a rigid member and a spring member, and having an outwardly projecting portion, a reciprocative element having spaced apart upper and lower tappets which overlie the path of the projecting portions of the jaws, means for reciprocating said element whereby the lower tappets impinge against the opposing projecting portions of the lowermost jaws and project said jaws into the path of the conveyer and the ends of the boxes therein contained, and whereby the upper tappets impinge against the opposing projecting portions of the uppermost jaws and retract said jaws from the conveyer, and fixed rings supported adjacent the sides of the wheel and between the rigid and spring members of the respective jaws.

Signed at Barberton, in the county of Summit and State of Ohio, this 20th day of September, A. D. 1919.

CHARLES F. WRIGHT.